United States Patent [19]
Goedderz

[11] Patent Number: 5,065,486
[45] Date of Patent: Nov. 19, 1991

[54] APPARATUS FOR FITTING FLEXIBLE STRIPS

[75] Inventor: Dieter Goedderz, Erkelenz, Fed. Rep. of Germany

[73] Assignee: Draftex Industries Limited, Edinburgh, Scotland

[21] Appl. No.: 601,878

[22] Filed: Oct. 22, 1990

[30] Foreign Application Priority Data

Nov. 8, 1989 [GB] United Kingdom ............... 8925206

[51] Int. Cl.$^5$ .......................................... B23P 21/00
[52] U.S. Cl. ...................................................... 29/235
[58] Field of Search ................ 29/450, 451, 417, 235, 29/701; 198/428, 617; 414/744 A, 225, 786; 901/41, 36, 31, 37, 26; 269/329

[56] References Cited

U.S. PATENT DOCUMENTS 4,747,197 5/1988 Charron ................................. 29/235
4,760,636 8/1988 Angelo et al. ......................... 29/450

FOREIGN PATENT DOCUMENTS 0253599 1/1988 European Pat. Off. .
2215762 9/1989 United Kingdom .
2227779 8/1990 United Kingdom .

Primary Examiner—Robert C. Watson
Attorney, Agent, or Firm—Leydig, Voit & Mayer

[57] ABSTRACT

A robot-held tool for applying a sealing strip to a flange comprises rollers which are contra-rotated by a motor within a housing and which engage opposite sides of the sealing strip to press it onto the flange, downward pressure onto the sealing strip being maintained by a non-driven roller. The housing is carried by a frame which is in turn connected to the robot via a coupling. The frame is freely angularly movable relative to a shaft which supports the housing. When the rollers are energized, they pull the tool along the flange. When a curve in the flange is reached, the housing and its supporting shaft automatically swivel relative to the remainder of the frame and to the robot. The robot then thereafter re-positions the frame back into the previous position which it had relative to the housing. In this way, the majority of the guiding of the tool along the flange is carried out by the tool itself and programming and adjustment of the robot are simplified. A hand-operated version is also disclosed.

24 Claims, 5 Drawing Sheets

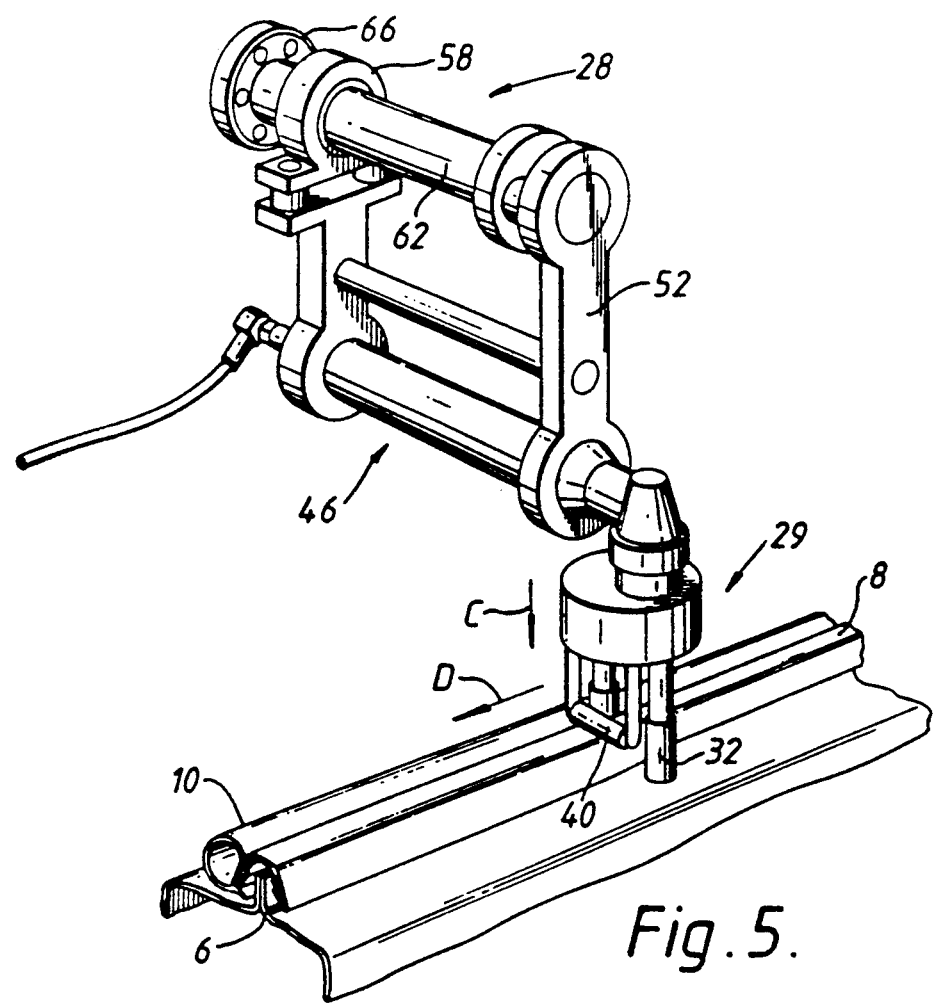
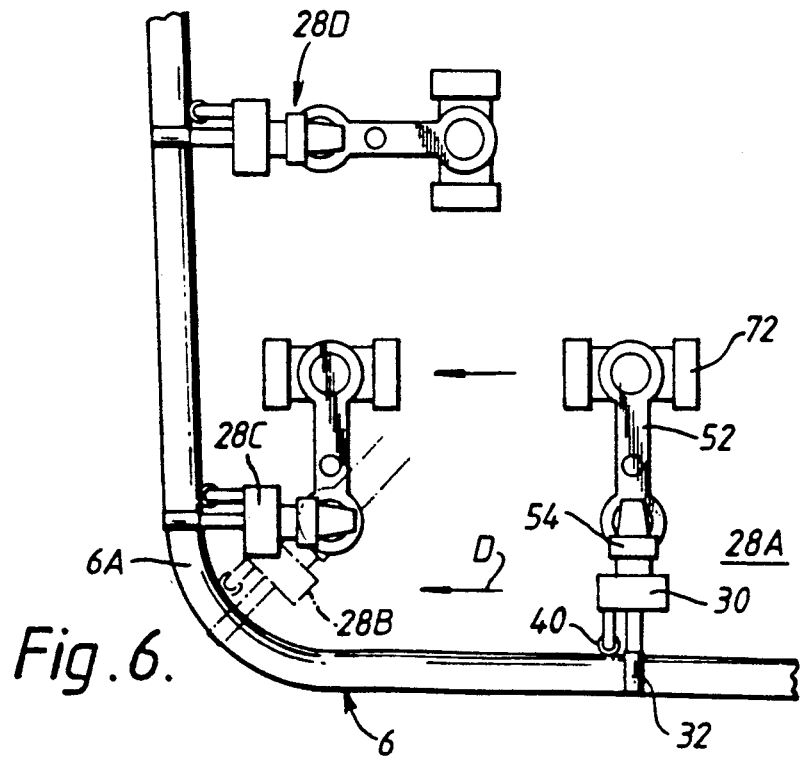

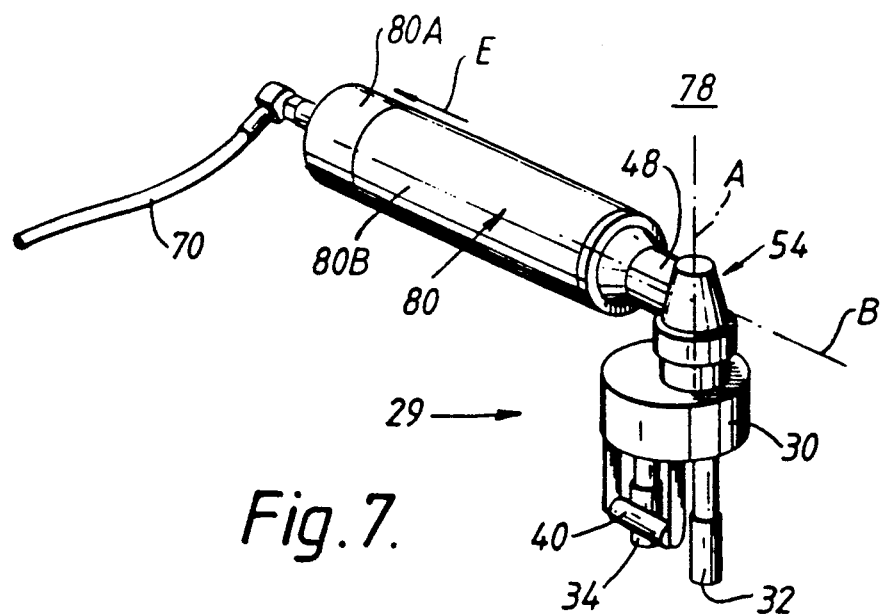
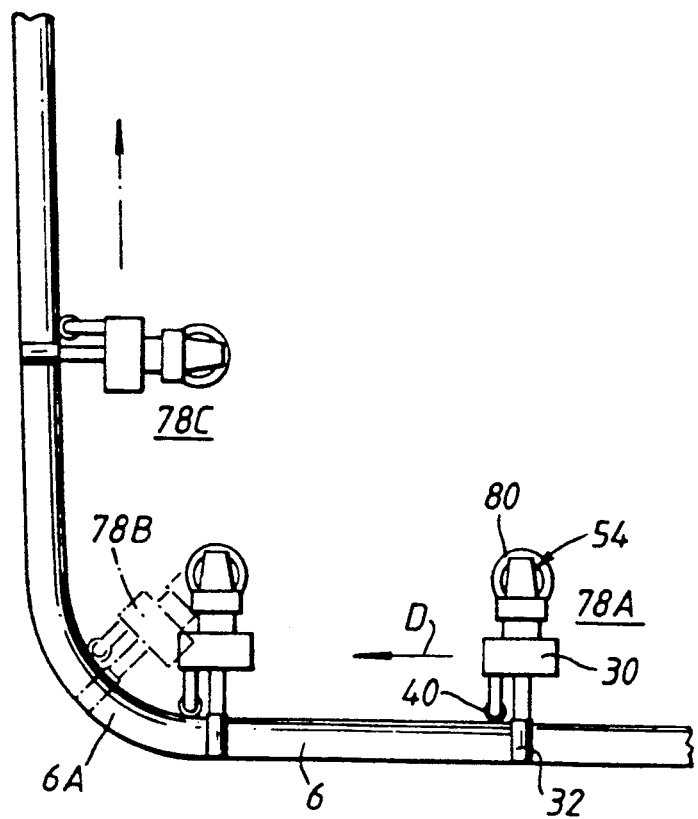

APPARATUS FOR FITTING FLEXIBLE STRIPS

BACKGROUND OF THE INVENTION

The invention relates to apparatus for fitting flexible strips. For example, such strips may be sealing or trimming strips which are required to be fitted around a door or other closable opening on a motor vehicle body.

SUMMARY OF THE INVENTION

According to the invention, there is provided a tool for fitting a length of channel-shaped strip onto a mounting flange or the like, comprising a body portion carrying strip engaging means for engaging the outside surface of the strip when on the mounting flange and which includes at least one rotatable roller contacting the said surface of the strip, support means for supporting the body portion, motor means carried by the body portion for rotating the roller and thereby frictionally driving the body portion and the mounting means along the length of the strip on the flange, and mounting means permitting relative angular movement between the body portion and the support means to enable the body portion to move relative to the support means at a curve or bend in the flange.

According to the invention, there is further provided a tool for fitting a channel-shaped strip onto a mounting flange or the like, comprising a body portion incorporating a motor and first and second rollers rotatable about parallel axes and connected to be contra-rotated by the motor and spaced apart by such distance as to engage opposite sides of the strip on the flange, a third roller carried by the body portion and rotatable about an axis transverse to the axes of the first and second rollers and mounted to engage the outside of the base of the channel of the strip on the flange, a frame carrying the body portion via swivel means permitting the body portion to swivel angularly relative to the frame about a swivel axis generally parallel to but spaced from the axis of the third roller, and means for connecting the frame to a robot for supporting the frame adjacent the strip on the flange, such that rotation of the first and second rollers by the motor drives the body portion along the strip on the flange so that the rollers press the strip into firm contact with the flange and the swivel means permits the body portion to move about the said swivel axis relative to the frame at corners or bends in the flange without immediate movement of the frame.

According to the invention, there is yet further provided a tool for fitting a channel-shaped strip onto a mounting flange or the like, comprising a body portion incorporating a motor and first and second rollers rotatable about parallel axes and connected to be contra-rotated by the motor and spaced apart by such distance as to engage opposite sides of the strip on the flange, a third roller carried by the body portion and rotatable about an axis transverse to the axes of the first and second rollers and mounted to engage the outside of the base of the channel of the strip on the flange, and a handle carrying the body portion via swivel means permitting the body portion to swivel angularly relative to the handle about a swivel axis generally parallel to but spaced from the axis of the third roller, such that rotation of the first and second rollers by the motor drives the body portion along the strip on the flange so that the rollers press the strip into firm contact with the flange and the swivel means permits the body portion to move about the said swivel axis relative to the handle at corners or bends in the flange without immediate movement of the frame.

DESCRIPTION OF THE DRAWINGS

Tools embodying the invention for fitting a sealing strip to the door surround of a motor vehicle body will now be described, by way of example only, with reference to the accompanying diagrammatic drawings in which:

FIG. 5 corresponds to FIG. 4 but shows the tool in engagement with a seal on the door surround;

FIG. 6 is a view showing the tool of FIG. 4 in operation and assembling the seal onto the door surround;

FIG. 7 is a perspective view corresponding to FIG. 4 but showing another of the tools; and FIG. 8 is a view corresponding to FIG. 5 but showing the tool of FIG. 7 in operation.

DESCRIPTION OF PREFERRED EMBODIMENTS

Figure 1:
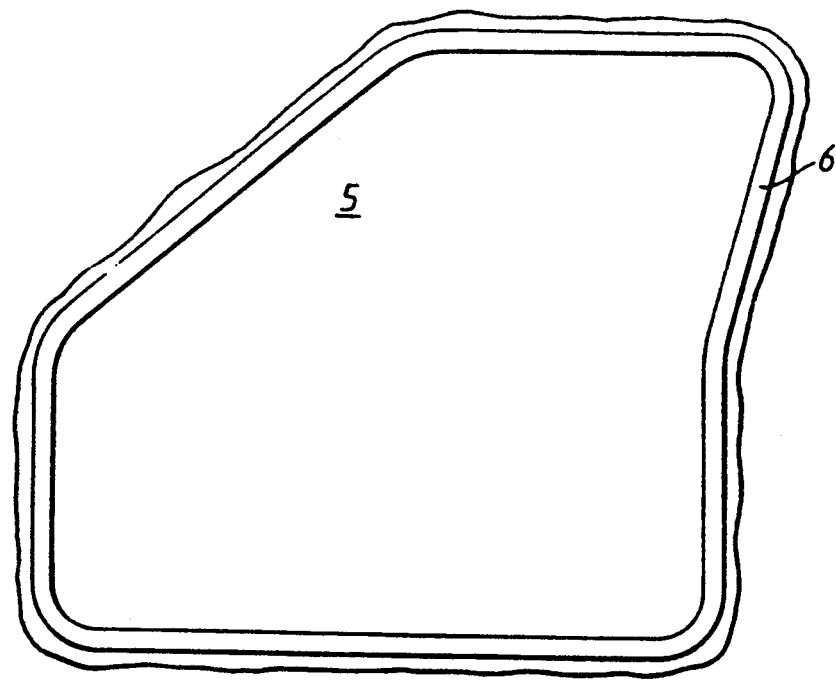
FIG. 1 is a side view of the door surround.
Figure 2:
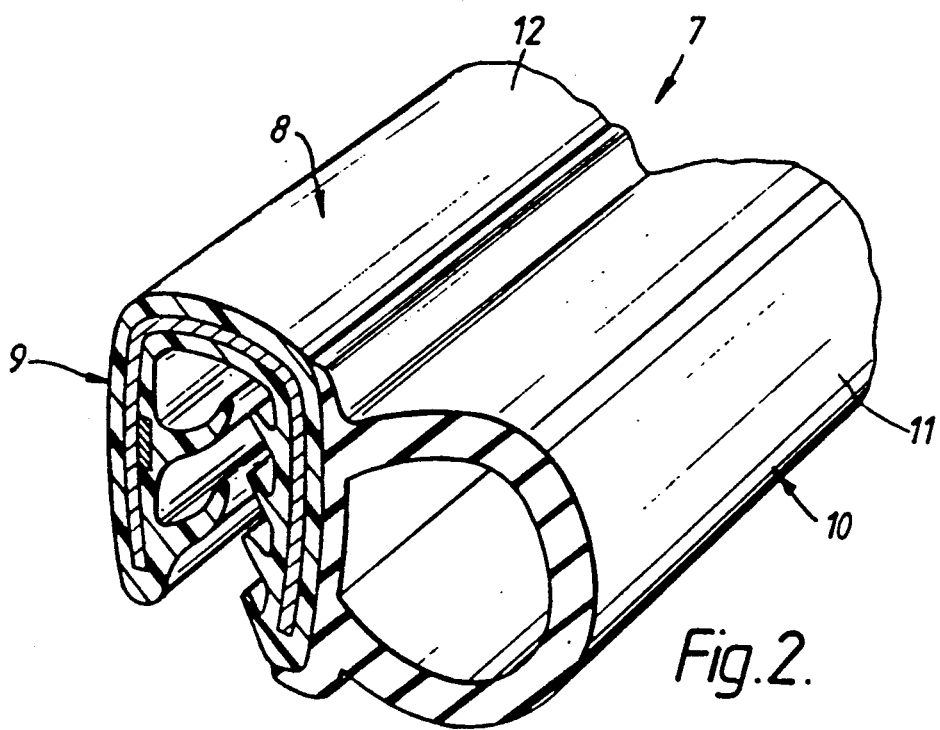
FIG. 2 is a perspective sectional view of the sealing strip.
Figure 3:
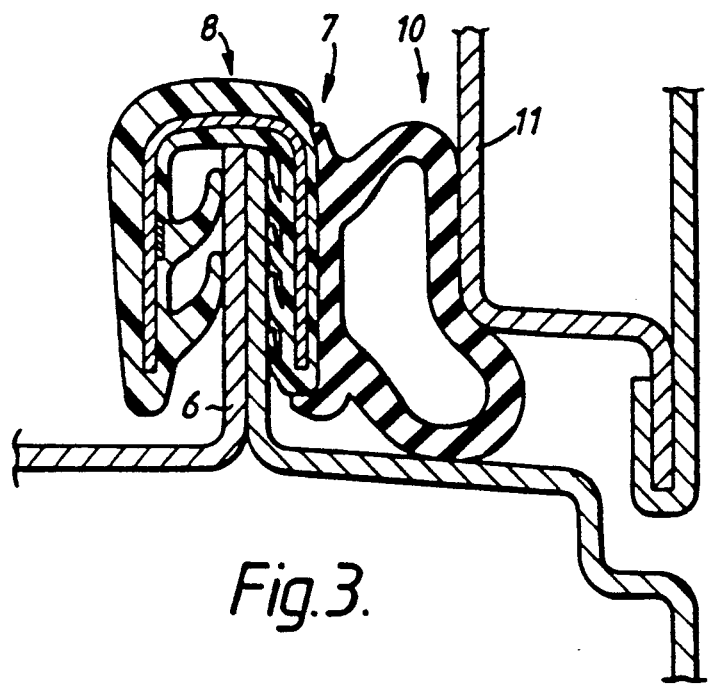
FIG. 3 is a cross-sectional view of the sealing strip in position on the door surround.

FIG. 1 shows a door opening 5 of a motor vehicle body. The door opening is defined by a flange 6 which is formed where the inner and outer skins of the body are welded together. In order to provide a seal for the door opening 5, the manufacture of the vehicle body involves the fitting of a door seal (see FIG. 2) onto the flange 6. As shown in FIG. 2, the door seal 7 comprises a channel-shaped gripping section 8 which, in use, embracingly grips the flange 6 and supports a soft tubular sealing section 10, so that the seal runs around the door opening with the sealing section 10 on the outside of the opening. As shown in FIG. 3, when the door (part of which is shown diagrammatically at 11) closes onto the opening, it partially compresses the tubular sealing section 10 so as to form a weather-proof seal. The tools now to be described are concerned with the automatic or semi-automatic fitting of the door seal onto the flange 6.

Figure 4:
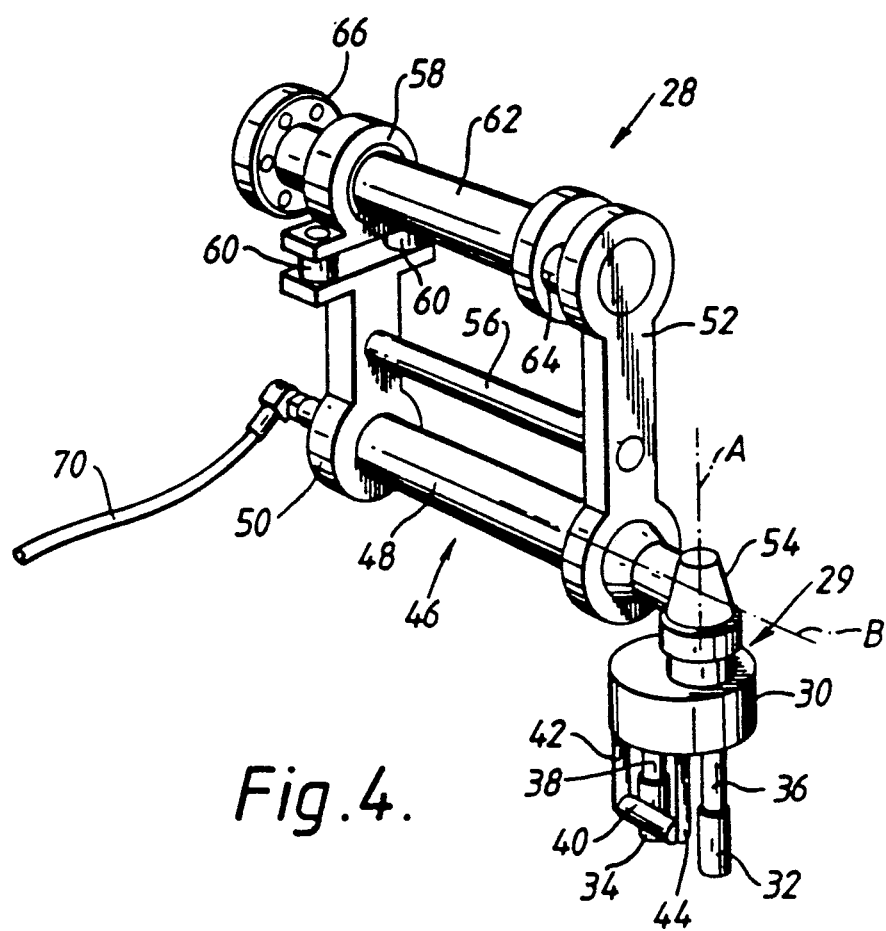
FIG. 4 is a perspective view of one of the tools.

The tool 28 of FIG. 4 has an operative part 29 including a motor housing 30 containing a suitable motor such as an electric or (preferably) a pneumatic motor. This motor is connected to drive two contra-rotatable rollers 32 and 34. These rollers are rotatable about parallel axes and are rotatably supported on support members 36 and 38 which extend downwardly from the housing 30.

In addition, the housing 30 supports a third roller 40. This is not motor-driven but is freely rotatable about a horizontal axis supported by downwardly extending supports 42 and 44.

The housing 30 is supported by a frame indicated generally at 46. This frame comprises a shaft 48 which is rotatable within frame members 50 and 52 and extends through the latter where it is connected to the housing 30 by means of a coupling 54. The coupling 54 permits the operative part 29 of the tool to rotate relative to the shaft 48 about an axis A. The ability of the shaft 48 to rotate within frame members 50 and 52 enables the operative part 29 of the tool to rotate relative to the frame 46 about axis B.

Frame members 50 and 52 are joined together by a rigid bar 56 for strengthening purposes.

Frame member 50 is connected to a coupling 58 by means of stiff rubber blocks 60 for a purpose to be described. Coupling member 50 is clamped to a rod member 62 which is in turn connected to the upper end of frame member 52 by further stiff rubber blocks 64 (only one visible in the Figure). At its opposite end, the rod member 62 carries a connection 66 by means of which it may be linked to the operating arm of a robot.

The shaft 48 may be hollow to permit the supply of electrical or pneumatic power to the motor within the housing 30, such as by means of a connection shown at 70.

In use of the tool 28 shown in FIG. 4, a sealing strip of the general form shown in FIGS. 2 and 3 is placed on the mounting flange 6. The tool is then placed over the seal 7 on the flange 6 so that the roller 32 engages the outside wall 9 (FIG. 2) of the gripping section 8 and the roller 34 engages the outside surface 11 of the sealing section 10. The roller 40 engages the inverted base 12 of the gripping section 8. Such positioning of the tool on the sealing strip is shown in FIG. 5.

The tool is brought into the position shown in FIG. 5 automatically by a robot arm which is attached to the frame 46 at the coupling 66 (FIG. 4). The robot then energises the motor within the housing 30 so as to contra-rotate the rollers 32 and 34. The rollers thus drive the tool along the length of the sealing strip on the flange, the spacing between the rollers 32 and 34 being selected such as to press the sides of the gripping section 8 into firm contact with the sides of the flange. At the same time, the robot arm maintains pressure in the direction of the arrow C so that the roller 40 presses the gripping section 8 downwards onto the flange.

FIG. 6 shows the tool 28 in three different positions at it travels along the flange 6. Part of the robot arm 72 carrying the tool is also shown. At 28A, the tool has the orientation shown in FIGS. 4 and 5. As the rollers 32 and 34 rotate, the tool and the robot arm are carried in the direction of extension of the flange as shown by arrow D. As the tool reaches a bend 6A in the flange 6, the action of the rollers 32,34 and 40 is such that the operative part 29 of the tool swivels relative to the frame 46 as shown dotted at 28B and at 28C. The attitude in space of the robot hand 72 and the frame 46 does not immediately change. This enables the rollers 32, 34 and 40 to follow the bend in the flange without any precise adjustments of the robot arm 72 itself. Once the tool is in the position shown at 28C, the rollers 32 and 34 now drive the tool in a vertically upward direction and this is sensed by the robot arm, resulting in the robot re-positioning the robot arm 72 and the frame 46 into the same attitude, (relative to the operative part 29 of the tool) as shown in FIG. 4—all as shown at 28D.

The tool continues to move vertically upwards under the action of the driven rollers 32 and 34 until it reaches the next bend or corner (not shown) in the flange, whereupon a similar procedure occurs: thus, the operative part of the tool follows the corner or bend in the flange and swivels with respect to the frame 46, and thereafter the robot moves the robot hand through an appropriate angle so as to bring the frame 46 and the operative part of the tool back into the relationship shown in FIG. 4.

In this way, programming of the robot is simplified. The tool itself guides the robot arm to follow the configuration of the flange.

There may be local variations in the position or attitude of the flange. These may be caused by constructional imperfections such as welds or the like. In addition, or instead, however, the flange may bend or curve slightly out of its general plane. In order to permit such positional variations to be accommodated without the need for continual pre-programmed adjustments by the robot, the rubber joints 60 and 64 permit a certain amount of flexure within the mounting frame 46, thus permitting the operative part 29 of the tool to alter its attitude relative to the frame 46 (in addition to its rotation about the axis B).

The tool shown may be used with particular advantage for mounting a sealing strip of the type shown in co-pending United Kingdom Patent Application No. 8727690 (Publication No. 2212844) though may be used for other types of seal as well. Advantageously, the spacing between rollers 32 and 34 is adjustable, either manually by the operator when placing the tool over the sealing strip or automatically by means of the robot.

FIG. 7 shows a modified form of the tool. In FIG. 7, items corresponding to those in FIG. 4 are correspondingly referenced. The tool 78 of FIG. 7 differs from the tool 28 of FIG. 4 in that the tool 78 is intended for manual rather than robot operation. As shown, the operative part 29 of the tool 78 is virtually identical with that shown in FIG. 4 and, like the latter, it is supported by means of a coupling 54 permitting rotation about axis A. However, there is no frame 46. The shaft 48 is instead held within a hand grip 80 which is rotatable relative to the shaft 48 and is intended to be grasped by both hands of the operator. As before, the connection 70 for the power for the motor within the housing 30 passes through the shaft 48.

In use, the operator picks up the tool 78 by gripping the hand grip 80 and applies the tool to the sealing strip already on the flange 6, the rollers 32,34 and 40 engaging the sealing strip in the same manner as described above with reference to FIGS. 4 and 5. The tool is thus held in the general position shown at 78A in FIG. 8. The operator then energises the motor within the housing 30. This is done by means of a switch incorporated within the hand grip 80. As shown in FIG. 7, one part 80A of the hand grip 80 can be moved axially relative to the remaining part 80B in the direction of an arrow E against a spring. This axial movement activates a switch (not visible) incorporated within the hand grip 80 and energises the motor. The rollers 32 and 34 commence to rotate and the tool 78 moves along the length of the flange in the direction of the arrow D (FIG. 8). The rollers 32 and 34 press the sides of the gripping section 8 into tight gripping engagement with the flange. At the same time, the operator maintains sufficient pressure on the roller 40, via the hand grip 80, so as to press the gripping section 8 firmly onto the flange via the base 12.

When the tool reaches a bend 6A in the flange, the operator does not alter the attitude in space in which he holds the hand grip 80. However, and as shown dotted at 78B, the tool 78 rotates relative to the hand grip 80 (about axis B, FIG. 7) as the driven rollers 32 and 34 follow the curve in the flange. This process continues and eventually the tool assumes the attitude shown at 78C.

The tool continues to be driven along the flange and follows succeeding bends or curves in the same manner. The operator does not have to adjust the position of his hands to accommodate the bends or curves in the flange, such adjustment being automatically performed as a result of the ability of the operative part 29 of the tool to swivel relative to the hand grasp 80.

If at any time the operator removes one of his hands from the hand grasp 80, the two parts 80A and 80B will move back towards each other, in an axial direction, under the action of the spring referred to above, and the switch activating the motor will open, thus de-energising the motor immediately.

Again, the tool may advantageously be used to facilitate the fitting of the type of seal shown in co-pending United Kingdom Patent Application No. 8727690 (Publication No. 2212844) though may be used for other types of seal as well.

What is claimed is:

1. A tool for fitting a length of channel-shaped strip onto a mounting flange or the like, comprising
   a body portion,
   strip engaging means carried by the body portion for engaging the outside surface of the strip when on the mounting flange and which includes at least one rotatable roller contacting the said surface of the strip,
   support means for supporting the body portion,
   motor means carried by the body portion for rotating the roller and thereby frictionally driving the body portion and the strip engaging means along the length of the strip on the flange, and
   mounting means permitting relative angular movement between the body portion and the support means at a curve or bend in the flange, the relative angular movement being about an axis which is transverse to an spaced from the direction of extension of the flange.

2. A tool according to claim 1, in which the strip engaging means includes a second roller, the two rollers being positioned to rotate about parallel axes and for engaging opposite sides of the strip.

3. A tool according to claim 2, in which the strip carries a relatively soft sealing part running along the outside of one of the side walls of the channel thereof, and the said rollers are spaced apart such that one engages this sealing section and the other engages the opposite side wall of the channel.

4. A tool according to claim 2, in which the second roller is connected to be driven by the motor means but to be rotatable in the opposite direction to the first-mentioned roller.

5. A tool for fitting a length of channel-shaped strip onto a mounting flange or the like, comprising
   a body portion,
   strip engaging means carried by the body portion for engaging the outside surface of the strip when on the mounting flange and which includes first and second rotatable rollers the two rollers being positioned to rotate about parallel axes and for engaging the said outside surface of the opposite sides of the strip, and a third rotatably mounted roller positioned to engage the outside of the base of the channel of the strip,
   support means for supporting the body portion,
   motor means carried by the body portion for rotating at least the first roller and thereby frictionally driving the body portion of the strip engaging means along the length of the strip on the flange, and
   mounting means permitting relative angular movement between the body portion and the support means at a curve or bend in the flange.

6. A tool according to claim 1, including coupling means for coupling the support means to a robot.

7. A tool according to claim 6, including flexible means interposed between the coupling means and the support means to permit limited movement between the coupling means and the body portion in directions other than the direction of the said angular movement.

8. A tool according to claim 1, in which the support means comprises a handle by means of which an operator may manually grasp the tool.

9. A tool for fitting a length of channel-shaped strip onto a mounting flange or the like, comprising
   a body portion,
   strip engaging means carried by the body portion for engaging the outside surface of the strip when on the mounting flange and which includes at least one rotatable roller contacting the said surface of the strip,
   support means for supporting the body portion and comprising a handle by means of which an operator may manually grasp the tool,
   motor means carried by the body portion for rotating the roller and thereby frictionally driving the body portion and the strip engaging means along the length of the strip on the flange,
   mounting means permitting relative angular movement between the body portion and the support means at a curve or bend in the flange, and
   switch means associated with the handle such that removal of a hand of the operator from the handle operates the switch means, and means responsive to such operation of the switch means to de-energise the motor means.

10. A tool for fitting a channel-shaped strip onto a mounting flange or the like, comprising
    a body portion incorporating a motor and first and second rollers rotatable about parallel axes and connected to be contra-rotated by the motor and spaced apart by such distance as to engage opposite sides of the strip on the flange,
    a third roller carried by the body portion and rotatable about an axis transverse to the axes of the first and second rollers and mounted to engage the outside of the base of the channel of the strip on the flange,
    a frame,
    swivel means connecting the frame to the body portion to permit the body portion to swivel angularly relative to the frame about a swivel axis generally parallel to but spaced from the axis of the third roller, and
    means for connecting the frame to a robot for supporting the frame adjacent the strip on the flange, such that rotation of the first and second rollers by the motor drives the body portion along the strip on the flange so that the rollers press the strip into firm contact with the flange and the swivel means permits the body portion to move about the said swivel axis relative to the frame at corners or bends in the flange without immediate movement of the frame.

11. A tool according to claim 10, including flexible means interposed between the coupling means and the frame to permit limited movement of the frame and the body portion relative to the coupling means in directions other than about the said swivel axis.

12. A tool for fitting a channel-shaped strip onto a mounting flange or the like, comprising a body portion incorporating a motor and first and second rollers rotatable about parallel axes and connected to be contra-rotated by the motor and spaced apart by such distance as to engage opposite sides of the strip on the flange, a third roller carried by the body portion and rotatable about an axis transverse to the axes of the first and second rollers and mounted to engage the outside of the base of the channel of the strip on the flange, a handle, and swivel means connecting the handle to the body portion to permit the body portion to swivel angularly relative to the handle about a swivel axis generally parallel to but spaced from the axis of the third roller, such that rotation of the first and second rollers by the motor drives the body portion along the strip on the flange so that the rollers press the strip into firm contact with the flange and the swivel means permits the body portion to move about the said swivel axis relative to the handle at corners or bends in the flange without immediate movement of the frame.

13. A tool according to claim 5, in which the strip carries a relatively soft sealing part running along the outside of one of the side walls of the channel thereof, and the said first and second rollers are spaced apart such that one engages this sealing part and the other engages the opposite side wall of the channel.

14. A tool according to claim 5, in which the second roller is connected to be driven by the motor means but to be rotatable in the opposite direction to the first roller.

15. A tool according to claim 5, including coupling means for coupling the support means to a robot.

16. A tool according to claim 15, including flexible means interposed between the coupling means and the support means to permit limited movement between the coupling means and the body portion in directions other than the direction of the said relative angular movement.

17. A tool according to claim 5, in which the support means comprises a handle by means of which an operator may manually grasp the tool.

18. A tool according to claim 17, including switch means associated with the handle such that removal of a hand of the operator from the handle operates the switch means, and means responsive to such operation of the switch means to de-energise the motor means.

19. A tool according to claim 9, in which the strip engaging means includes a second roller, the two rollers being positioned to rotate about parallel axes and for engaging opposite sides of the strip.

20. A tool according to claim 19, in which the strip carries a relatively soft sealing part running along the outside of one of the side walls of the channel thereof, and the said rollers are spaced apart such that one engages this sealing part and the other engages the opposite side wall of the channel.

21. A tool according to claim 19, in which the second roller is connected to be driven by the motor means but to be rotatable in the opposite direction to the first-mentioned roller.

22. A tool according to claim 19, in which the strip engaging means includes a third rotatable mounted roller positioned to engage the outside of the base of the channel of the strip.

23. A tool according to claim 9, including coupling means for coupling the support means to a robot.

24. A tool according to claim 23, including flexible means interposed between the coupling means and the support means to permit limited movement between the coupling means and the body portion in directions other than the direction of the said angular movement.

* * * * *